(12) United States Patent
Ritchey

(10) Patent No.: US 6,663,457 B2
(45) Date of Patent: Dec. 16, 2003

(54) STUFFED TOY WITH REPLACEABLE PLAY-STIMULATION ITEM

(75) Inventor: Sharon A. Ritchey, Phoenix, AZ (US)

(73) Assignee: Cats with an Attitude, Inc., Phoenix, AZ (US)

( * ) Notice: Subject to any disclaimer, the term of this patent is extended or adjusted under 35 U.S.C. 154(b) by 0 days.

(21) Appl. No.: 10/211,444

(22) Filed: Aug. 2, 2002

(65) Prior Publication Data

US 2002/0187718 A1 Dec. 12, 2002

Related U.S. Application Data

(63) Continuation-in-part of application No. 09/532,665, filed on Mar. 21, 2000, which is a continuation-in-part of application No. 08/612,385, filed on Mar. 7, 1996, now Pat. No. 6,048,248.

(51) Int. Cl.[7] .............................................. A63H 33/00
(52) U.S. Cl. ........................... 446/71; 446/73; 446/76; 119/702; 119/711
(58) Field of Search .......................... 446/71, 72, 73, 446/76, 369, 370, 371, 372, 385, 387; 119/702, 707, 711

(56) References Cited

U.S. PATENT DOCUMENTS

| | | | |
|---|---|---|---|
| 1,007,922 A | 11/1911 | Cohen | |
| 2,217,102 A | 10/1940 | Cohen | |
| 2,591,379 A | 4/1952 | Schradermeier | 150/35 |
| 2,995,865 A | 8/1961 | Kiscadden | |
| 4,464,861 A | * 8/1984 | Fogarty et al. | 446/370 |
| 4,694,829 A | 9/1987 | Frye | |
| 4,715,840 A | 12/1987 | Swift | |
| 4,781,648 A | * 11/1988 | Garfinkel | 446/321 |
| 4,816,000 A | 3/1989 | Hsu | |
| 4,822,285 A | 4/1989 | Summerville | |
| 4,950,194 A | 8/1990 | Gullace | 446/72 |
| 5,059,149 A | 10/1991 | Stone | |
| 5,211,282 A | 5/1993 | Ting | |
| 5,489,231 A | 2/1996 | Leyser | |
| 5,597,339 A | 1/1997 | Spector | |
| 6,048,248 A | * 4/2000 | Ritchey | 446/71 |
| 6,089,947 A | 7/2000 | Green | 446/268 |
| 6,165,038 A | 12/2000 | Muller | 446/219 |
| 6,254,450 B1 | 7/2001 | Schonberger | 446/72 |
| 6,350,169 B1 | 2/2002 | Holt | 446/327 |

* cited by examiner

*Primary Examiner*—Derris H Banks
*Assistant Examiner*—Ali F Abdelwashed
(74) *Attorney, Agent, or Firm*—Jordan M. Meschow; Meschkow & Gresham, PLC

(57) ABSTRACT

A stuffed toy (10) for play by an animal is taught. The stuffed toy (10) has an outer pliable shell (12) formed of a first fur (54), an inner pliable shell (56) formed of a second fur (54') located within the outer pliable shell (12), a pouch (58) formed of a third fur (54") located within the inner pliable shell (56), and a play-stimulation item (68) located within the pouch (58) to provide stimulation for play by the animal. The outer and inner pliable shells (12,56) form an interior cavity (14) having an opening (22) though the outer and inner pliable shells (12,56). A hook-and-loop fastener (72) is used to releasably seal the opening (22). The pouch (58) is configured to pass through the opening (22) and is contained within the interior cavity (14) during the play by the animal. The play-stimulation item (68) may be an olfactory-excitation material (catnip) or a sound-producing device (squeaker).

18 Claims, 3 Drawing Sheets

STUFFED TOY WITH REPLACEABLE PLAY-STIMULATION ITEM

RELATED INVENTION

The present invention is a continuation in part (CIP) of "STUFFED TOY WHICH ACCOMODATES REMOVABLE PLAY-STIMULATION ITEM," U.S. patent application Ser. No. 09/532,665, filed Mar. 21, 2000, which is incorporated by reference herein. application Ser. No. 09/532,665 is itself a CIP of "APPARATUS FOR HOLDING A QUANTITY OF STUFFING MATERIAL AND METHOD OF ASSEMBLING SAME," U.S. patent application Ser. No. 08/612,385, filed Mar. 7, 1996, now U.S. Pat. No. 6,048,248, issued Apr. 11, 2000, which is incorporated by reference herein.

TECHNICAL FIELD OF THE INVENTION

The present invention relates generally to stuffed toys. In particular, the present invention relates to a stuffed toy with an internal pouch containing a play-stimulation item and having a sealable opening that facilitates the replacement of that play-stimulation item.

BACKGROUND OF THE INVENTION

Stuffed toys are designed for a variety of uses. For example, children and pets play with stuffed animals, dolls, balls, and other toys having innumerable shapes and sizes, fragrance-filled bags (sachets) are used to deodorize various environments, and fabric pouches or containers are designed to carry and apply cosmetics or other agents. In addition, animal toys may contain an aromatic substance to stimulate play.

Many stuffed toys for animals are permanently sealed. Although pet toys may be filled with a variety of materials, cats in particular enjoy playing with toys containing catnip because of the minty fragrance of the catnip. Unfortunately, catnip toys that are permanently sealed may have to be replaced after the catnip has become stale. Similarly, bags filled with potpourri or other fragrant material are usually disposed of when they lose their characteristic scents.

Some stuffed toys may provide access to interior materials to extend the useful life of the toys. For example, some stuffed toys may incorporate a zipper or other closure device to facilitate the insertion and removal of filler materials. However, zippers, snaps, buttons, and other closure devices may be unsightly if they are visually exposed. Furthermore, if the closure device is physically exposed or easily manipulable, a stuffed toy may be inadvertently opened by a child or pet. Such an inadvertent opening may result in loss of filler material or other contents.

Some stuffed toys may utilize asymmetrical patterns and/or bulky closure devices. Such features may make assembly difficult by causing the pattern to pucker, kink, or deform during stitching or other manufacturing processes. In addition, such features may adversely affect the function and appearance of the finished product.

Some stuffed toys contain a "squeaker" or other noise-producing device to stimulate a pet or child during play. Such devices often contain metal or other hard parts that may pose a danger when playing with the toy. Such hard parts may cause a tooth to chip or break should the pet or child bite down on the device during play.

Additionally, if such a device were to be inadvertently released from the toy, the device may be ingested. This poses a threat of choking, gastric distress, or poisoning, depending upon the size or shape of the device and the materials of which the device is made.

Besides the potential dangers involved, a noise-producing device may be punctured or otherwise damaged during play, thus rendering the device inoperable. This is especially true of a bellows-type squeaker, which may be easily punctured by a pet's canine tooth. Once inoperative, the device ceases to stimulate the pet or child. This often results in a loss of interest in the toy.

Alternatively, some pets or children may repetitively and incessantly cause a noise-producing device to sound (e.g., producing a "squeak, squeak, squeak," without end). Such incessant sounding may be distracting to others, necessitating removal of the device from the toy.

In addition, some pets (especially some dogs) may suffer separation anxiety or boredom when left alone. This condition may lead to destructive behavior on the part of the pet. Such destructive behavior often takes the form of destroying a toy or other object the pet associates with the absent human. In the case of a stuffed toy, the pet may vigorously bite and/or chew the toy until rewarded with an outpouring of stuffing material and any devices contained therein.

SUMMARY OF THE INVENTION

Accordingly, it is an advantage of the present invention that a stuffed toy containing a replaceable play-stimulation item is provided.

Another advantage of the present invention is that it provides a stuffed toy having a sealable opening for the insertion and removal of a pouch containing the play-stimulation item.

A further advantage is that the present invention provides a stuffed toy that is resistant to the release of filler material by biting and/or chewing.

The above and other advantages of the present invention are carried out in one form by a stuffed toy configured for play by an animal. The stuffed toy incorporates a pliable shell formed of a first fur, a pouch formed of a second fur and contained within the pliable shell during play by the animal, and a play-stimulation item contained within the pouch.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
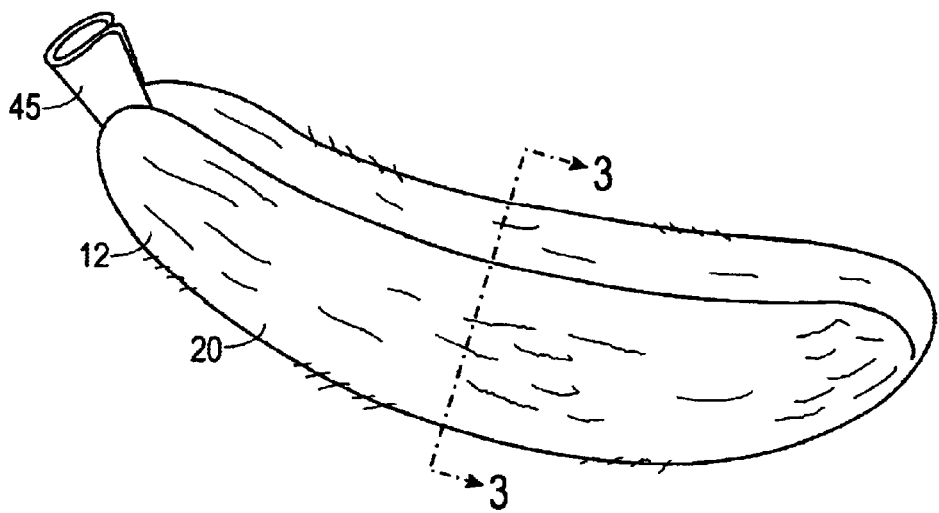
FIG. 1 is a perspective view of a stuffed toy for holding a quantity of stuffing material with its opening sealed.
Figure 2:
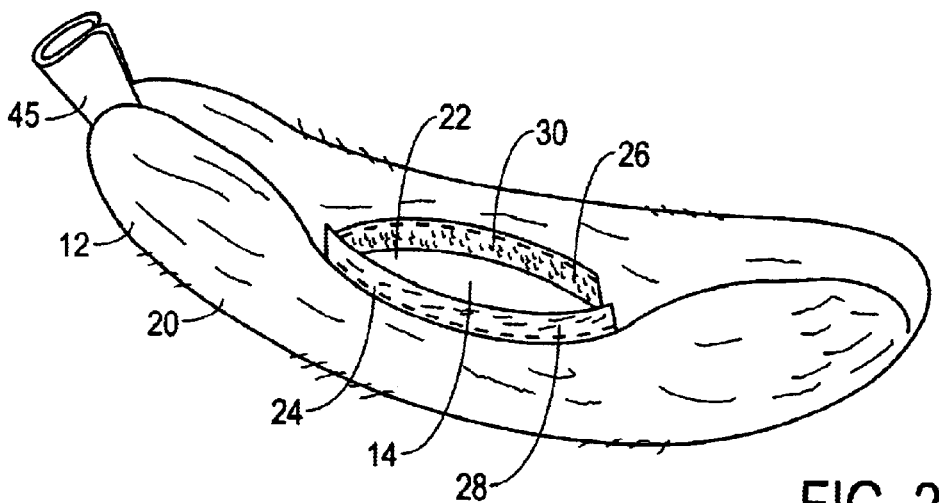
FIG. 2 is a perspective view of the stuffed toy of FIG. 1 with its opening unsealed.
Figure 3:
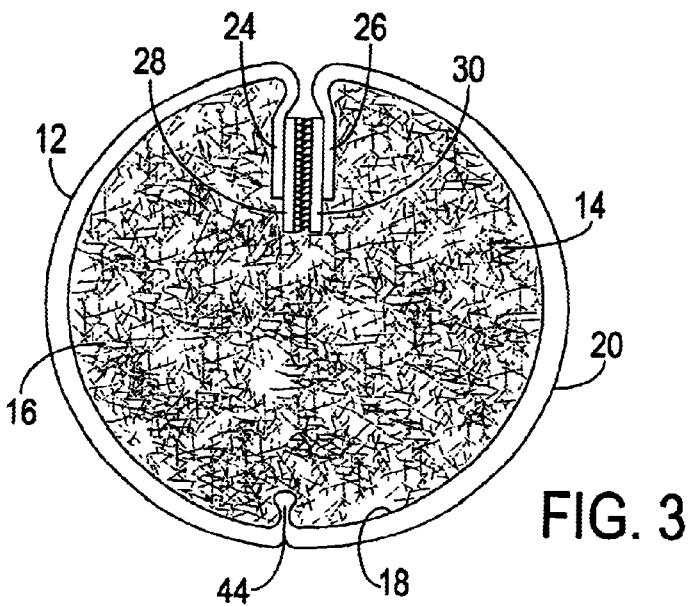
FIG. 3 is a cross sectional view of the stuffed toy of FIG. 1 as viewed from line 3—3.

FIGS. 1 and 2 are perspective views of a stuffed toy 10 having a pliable shell 12 with an opening 22 through which a stuffing material 16 may be inserted to and/or removed from stuffed toy 10. In FIG. 1, opening 22 is sealed (closed), and in FIG. 2 opening 22 is unsealed (open). FIG. 3 is a cross-sectional view of stuffed toy 10 as viewed from line 3—3. The following discussion refers to FIGS. 1 through 3.

Generally, stuffed toy 10 is configured to hold a quantity of stuffing material 16 such that stuffing material 16 may be inserted and removed as necessary. Stuffed toy 10, as realized in the present invention, may be a fabric toy, a cosmetic dispensing bag, a deodorizing bag (sachet), or any other apparatus that holds a stuffing material.

In FIGS. 1 through 3, stuffed toy 10 is depicted as having the general shape of a banana. Those skilled in the art will appreciate that this is not a requirement of the present invention. The precise shape and size of stuffed toy 10 and the quantity and form of stuffing material may be altered as desired to meet specific applications.

Stuffed toy 10 includes pliable shell 12, which is preferably formed from a washable material. Although stuffed toy 10 is depicted in FIGS. 1 through 3 as a banana-shaped toy, shell 12 may be shaped, colored, and sized to suit individual applications. Shell 12 is hollow and encompasses an interior cavity 14 configured to hold stuffing material 16. As shown in FIG. 3, interior cavity 14 is substantially defined by an inner surface 18 of shell 12. An outer surface 20 of shell 12 may be textured and have an associated nap direction (not shown).

In a first preferred embodiment, stuffed toy 10 is a cat toy and stuffing material 16 is or contains catnip to stimulate play. To enable stuffed toy 10 to release the catnip essence, shell 12 is preferably formed from a relatively porous odor-permeable material.

Shell 12 includes a shell opening 22 formed therein. Opening 22 is configured to provide access to interior cavity 14. Stuffing material 16 is inserted and removed through opening 22. In the preferred embodiment, this allows replacement of stuffing material 16 through opening 22 when stuffing material 16 no longer stimulates play, e.g., when the catnip has become stale and lost its odor.

Surrounding opening 22 are a first flap 24 and a second flap 26. Flaps 24 and 26 may, but need not be, integrally formed in shell 12. As shown in FIG. 2, flaps 24 and 26 are each adjacent to opening 22 and are located on opposite sides of opening 22. Nothing requires flaps 24 and 26 to be configured as shown. For example, flaps 24 and 26 may be blended into shell 12 without having noticeable edges or corners.

A first sealing element 28 is coupled to first flap 24 and a second sealing element 30 is coupled to second flap 26 (see FIG. 3). Sealing elements 28 and 30 are coupled to outer surface 20 of shell 12 and are configured to releasably seal opening 22. Opening 22 is effectively sealed when sealing elements 28 and 30 engage one another. According to the preferred embodiment, sealing elements 28 and 30 are cooperating strips of a conventional hook-and-loop fastener. Of course, stuffed toy 10 may employ other suitable sealing components, such as snaps or adhesive strips.

Flaps 24 and 26 and sealing elements 28 and 30 are preferably configured such that flaps 24 and 26 extend into interior cavity 14 when opening 22 is sealed. This preferred sealing arrangement is shown in FIG. 3. As described above, first and second sealing elements 28 and 30 are coupled to outer surface 20 of first and second flaps 24 and 26, respectively. Thus, flaps 24 and 26 are folded inward within interior cavity 14 and sealing elements 28 and 30 are engaged to seal opening 22. Consequently, flaps 24 and 26 and sealing elements 28 and 30 are located substantially within interior cavity 14 when opening 22 is sealed. When sealed properly, flaps 24 and 26 and sealing elements 28 and 30 are hidden from view, which enhances the appearance of stuffed toy 10 and reduces the likelihood that stuffed toy 10 will be accidentally opened.

To promote efficient sealing of opening 22, the lengths of opening 22, flaps 24 and 26, and sealing elements 28 and 30 are approximately equal. This configuration reduces leakage of stuffing material 16 from the ends of opening 22.

Figure 4:
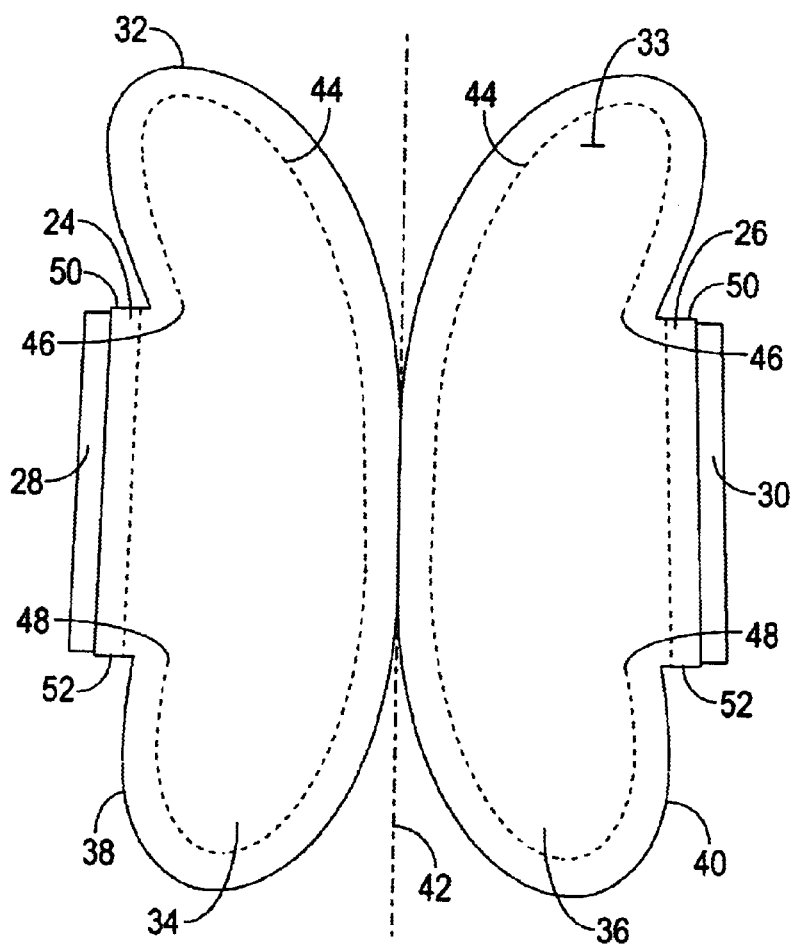
FIG. 4 is a top view of a pattern used to construct the stuffed toy of FIG. 1.

FIG. 4 shows a top view of a pattern 32 used to construct stuffed toy 10. The following discussion refers to FIGS. 1 through 4.

An inner side 33 of pattern 32 is shown face-up and a corresponding outer side is hidden from view. Shell 12 is preferably formed from pattern 32, which includes a first portion 34 and a substantially symmetrical second portion 36. First portion 34 has a first perimeter 38 and second portion 36 has a second perimeter 40. Pattern 32 is cut to form first and second flaps 24 and 26, which are located on first and second portions 34 and 36, respectively. In the preferred embodiment, flaps 24 and 26 extend approximately ¼ inch beyond the sections of pattern 32 that form the body of stuffed toy 10.

In accordance with a preferred method of construction, sealing elements 28 and 30 are coupled to pattern 32 before shell 12 is formed. For example, first and second sealing elements 28 and 30 may be sewn onto first and second flaps 24 and 26, respectively. Sealing elements 28 and 30 are coupled to the outer surface of pattern 32 such that their sealing surfaces (e.g., the hook and loop surfaces) are relatively continuous with the outer surface of pattern 32. As such, the sealing surfaces are hidden from view in FIG. 4. To ensure that opening 22 seals in a desirable manner, first and second sealing elements 28 and 30 preferably extend beyond the respective longitudinal edges of flaps 24 and 26, as shown in FIG. 3.

After first and second sealing elements 28 and 30 are attached to first and second flaps 24 and 26, respectively, pattern 32 is folded along a line 42 such that the outer sides of first and second portions 34 and 36 face one another. It should be appreciated that nothing requires pattern 32 to be formed from a single piece of material, e.g., shell 12 may be formed from two separate portions. First and second perimeters 38 and 40 are substantially aligned after pattern 32 is folded along line 42. Sealing elements 28 and 30 may be engaged to maintain the alignment of flaps 24 and 26 during the formation of a seam 44 that couples first and second portions 34 and 36 together.

Seam 44 is depicted as a dashed line in FIG. 4. Seam 44 is formed with the outer sides of portions 34 and 36 facing one another. In the preferred embodiment, seam 44 is formed by stitching around the perimeter of pattern 32. Of course, labels, decorative elements (such as a banana stem 45), and/or other accessories may be added to shell 12 while seam 44 is formed. Seam 44 is partially formed around the perimeter, i.e., seam 44 is discontinuous at opening 22 (see FIG. 2). In the preferred embodiment, the distance that seam 44 is offset from the edge of pattern 32 is approximately the same as the distance that flaps 24 and 26 extend beyond the edge of pattern 32. In other words, approximately ¼ inch of material remains between seam 44 and the edge of pattern 32.

Seam 44 has a first end 46 and a second end 48 that cooperate to define opening 22. In accordance with the preferred embodiment, first and second flaps 24 and 26 each have a first edge 50 and a second edge 52 that are substantially aligned with first and second seam ends 46 and 48, respectively. In other words, an imaginary line extended from first flap edge 50 approximately intersects a point defined by first seam end 46. Similarly, an imaginary line extended from second flap edge 52 approximately intersects a point defined by second seam end 48.

In an alternative embodiment (not shown) where flaps 24 and 26 are blended into pattern 32, flaps 24 and 26 do not have noticeable edges equivalent to first and second edges 50 and 52 described above. In such an embodiment, first and second sealing elements 28 and 30 may have edges that are substantially aligned with first and second seam ends 46 and 48.

First and second seam ends 46 and 48 are formed with an increased displacement from the perimeter of shell 12 at opening 22. In other words, the distance between the perimeter and seam 44 is greater at seam ends 46 and 48 than at the remaining portions of shell 12.

The preferred relationship between seam ends 46 and 48 and flap edges 50 and 52 enables opening 22 to be effectively sealed after stuffed toy 10 is filled with stuffing material 16. In addition, the construction of seam 44 reduces puckering and kinking of shell 12 during assembly, packaging, and while stuffed toy 10 is displayed.

After seam 44 is formed, shell 12 is in an inside-out state. Subsequently, shell 12 may be manipulated such that the inner sides of first and second portions 34 and 36 face one another. In other words, shell 12 is turned right side out (as shown in FIG. 2). If desired, shell 12 may be subsequently filled with stuffing material 16.

To seal opening 22, first and second flaps 24 and 26 are preferably folded inward such that they extend within interior cavity 14 (see FIG. 3). In FIG. 2, first flap 24 is in an unfolded position with first sealing element 28 facing outward, and second flap 26 is in a folded position with second sealing element 30 extending into interior cavity 14. In the folded positions, flaps 24 and 26 may be sealed together by engaging first and second sealing elements 28 and 30. As shown in FIG. 1, sealing elements 28 and 30 are preferably hidden from view when opening 22 is sealed. Because sealing elements 28 and 30 may be separated and resealed, stuffing material 16 may be easily removed to facilitate washing of shell 12. In addition, an aromatic stuffing material 16, such as catnip, may be replenished after it has become stale.

Figure 5:
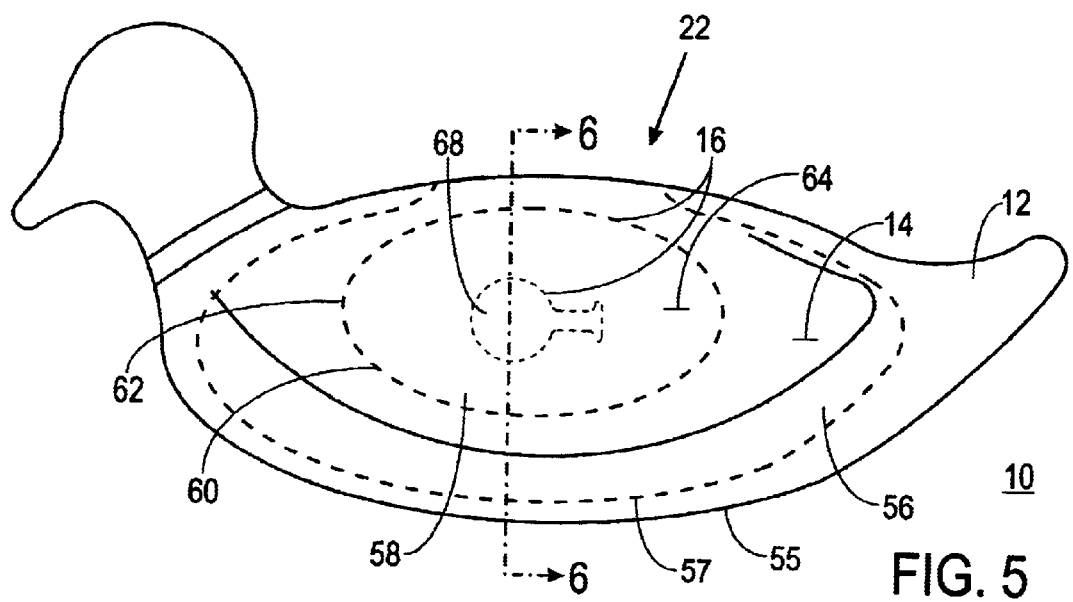
FIG. 5 is a side view of a stuffed toy in the shape of a duck.
Figure 6:
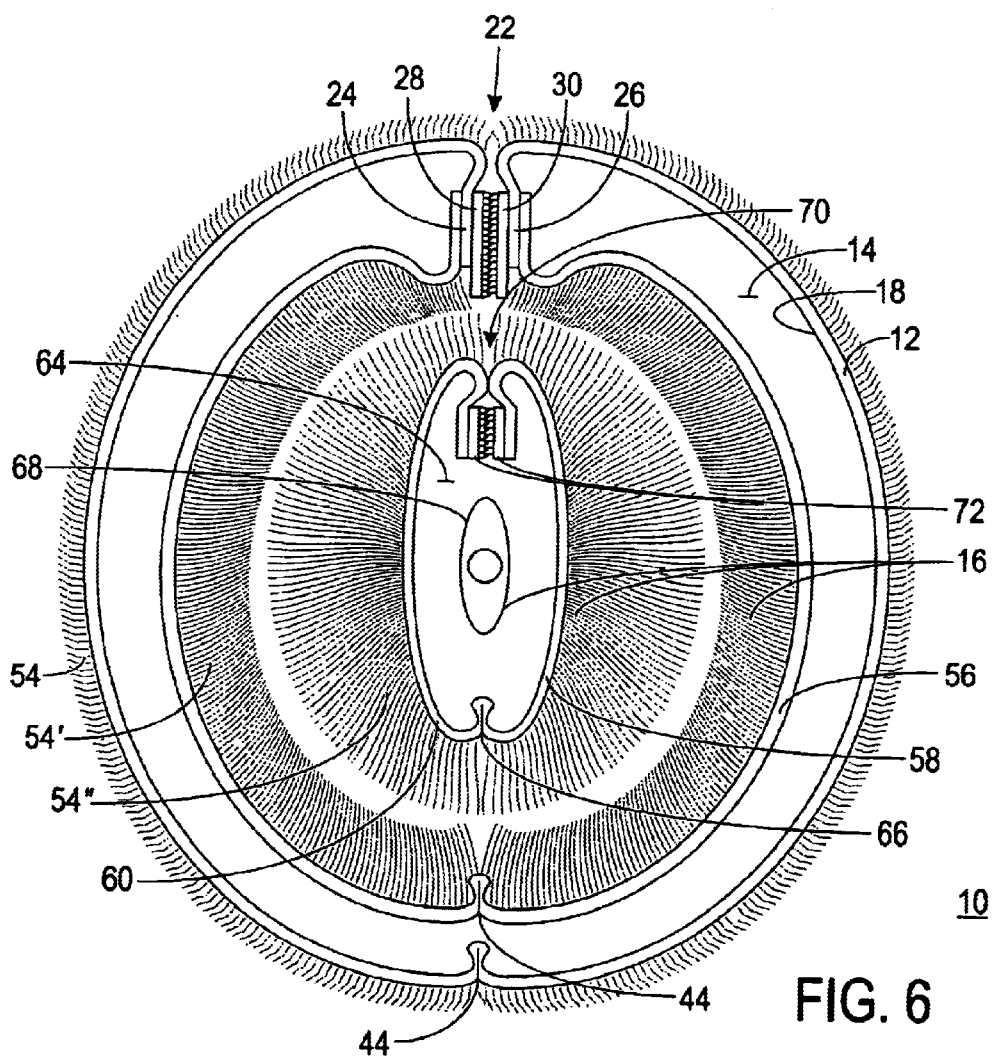
FIG. 6 is a cross sectional view of the stuffed toy of FIG. 5 as viewed from line 6—6.

FIG. 5 shows a side view and FIG. 6 shows a cross sectional view of stuffed toy 10 having the shape of a duckling. The following discussion refers to FIGS. 1 through 6.

In another preferred embodiment of stuffed toy 10, it is desirable that stuffed toy 10 be configured to inhibit stuffing material 16 from release through tears in pliable shell 12. Such tears may occur, especially with animal toys, when the animal bites and chews toy 10. Desirably, this is accomplished by configuring stuffed toy 10 so as to eliminate the use of loose filler material as stuffing material 16.

Pliable shell 12 of toy 10 may be formed of a fur 54 (FIGS. 5 and 6). For the purposes of the present invention, a "fur" shall be taken to include, but not be limited to, natural and synthetic furs and fur-like materials, e.g., real and faux animal skins, pelts, fabrics, sheepskins, etc. Furs are different from other flexible sheet materials in that they have a nap (hair, wool, fiber, etc.) attached to an underlayer (skin, fabric, etc.). This provides a significant increase in both bulk and penetration resistance over the underlayer material alone.

By forming shell 12 of fur 54, an increase in bulk of toy 10 is obtained as well as a resistance to dental penetration of shell 12. This increase in bulk permits a reduction in the amount of loose filler material as stuffing material 16 for a given bulk of toy 10.

Additionally, flaps 24 and 26 (FIGS. 3 and 4) may be extended, expanded, and sewn to become an inner pliable shell (a liner) 56 within outer pliable shell 12. Inner pliable shell 56 significantly increases the resistance to dental penetration of toy 10 by providing an additional layer of material. By also forming inner pliable shell 56 of a fur 54', an increase in bulk is also obtained. This additional increase in bulk permits a further reduction in the amount of loose filler material as stuffing material 16 for a given bulk of toy 10.

When formed of fur 54', inner shell 56 may serve as stuffing material 16 in lieu of a loose filler material (such as kapok or polyester fiberfill). This provides an advantage in that, should outer shell 12 be penetrated, stuffing material 16 will not be released as strands and clumps that may be ingested and/or create a mess.

Those skilled in the art will appreciate that fur 54 used to form outer shell 12 may or may not be the same as fur 54' used to form inner shell 56. It may be desirable to utilize only a single type of fur for both fur 54 and fur 54', e.g., to minimize production costs. On the other hand, it may be desirable that fur 54 be different from fur 54', e.g., fur 54 may be chosen for appearance, while fur 54' may be chosen for bulk. For example, fur 54 may be a short-napped synthetic leopard skin for appearance, while fur 54' may be a long-napped synthetic sheepskin for bulk.

When flaps 24 and 26 are extended to become inner pliable shell 56, a perimeter 55 of outer pliable shell 12 and a perimeter 57 of inner pliable shell 56 are sewn via a plurality of seams 44 so as to form interior cavity 14 within inner pliable shell 56, i.e., within both outer and inner pliable shells 12 and 56, while having a single shell opening 22 through both shells 12 and 56 into cavity 14. First and second sealing elements 28 and 30 of the hook-and-loop fastener are affixed to inner surface 18 of inner shell 56 in positions analogous to the positions they would occupy were flaps 24 and 26 not extended. That is, first sealing element (one of hook or loop part) 28 is affixed to inner surface (inside) 18 of inner pliable shell 56 at a first location proximate opening 22. Second sealing element (remaining loop or hook part) 30 is then affixed to inner surface (inside) 18 of inner pliable shell 56 at a second location proximate opening 22 in opposition to first sealing element 28. First and second locations are such that first sealing element 28 is configured to releasably engage second sealing element 30.

Whether or not flaps 24 and 26 are extended into inner shell 56, an internal pouch 58 is desirably used as additional stuffing material 16. Pouch 58 may also be formed of a fur 54". Those skilled in the art will appreciate that fur 54" used to form pouch 58 may or may not be the same as fur 54 used to form outer shell 12 and/or fur 54" used to form inner shell 56. It may be desirable to utilize only a single type of fur for all furs 54, 54', and 54". On the other hand, it may be desirable that two over even three different types of fur be used for furs 54, 54', and 54".

In the preferred embodiment of FIGS. 5 and 6, pouch 58 is formed of a pliable pouch shell 60 having a perimeter 62 forming a cavity 64. Perimeter 62 is desirably formed to substantially conform to perimeter 57 of inner shell 56, thereby spreading the bulk of pouch 58 throughout interior cavity 14.

If cavity 64 is to be sealed, a seam 66 is formed around perimeter 62 and closes pouch 58, entrapping play-stimulation item 68 within cavity 64.

If cavity 64 is to be accessible, seam 66 is partially formed around perimeter 62, thereby defining an opening 70 into cavity 64. A fastener 72 releasably closes opening 70 to entrap the contents to cavity 64.

Whether cavity 64 is sealed or accessible, pouch 58 and play-stimulation item 68 (i.e., the contents of cavity 64) together serve as stuffing material 16 for toy 10. Desirably, outer pliable shell 12, inner pliable shell, 56, and pliable pouch shell 60 are forms of furs 54, 54', and 54", respectively, selected to provide sufficient bulk to eliminate the need for a loose filler material, such as kapok or polyester fiberfill, as stuffing material 16.

Play-stimulation item 68 is desirably configured to issue an emission to provide stimulation of one or more senses of the animal. Play-stimulation item 68 may be an olfactory-excitation material, such as catnip, in which case the emission issued is a scent or odor. That is, pouch 58 may be configured as a catnip cachet, the scent of which provides stimulation to the sense of smell of the animal and encourages play with stuffed toy 10. When play-stimulation item 68 is exhausted, e.g., when the oils and other essences have dried in the catnip and insufficient scent is issued, play-stimulation item 68 may fail to stimulate play. In this case, a new pouch 58 containing a fresh play-stimulation item 68 (fresh catnip) may replace the exhausted pouch 58 to restore play stimulation.

Play-stimulation item 68 may be a sound-producing device, such as a mechanical or electronic squeaker, in which case the emission issued is a sound. When play-stimulation item 68 has become exhausted, That is, pouch 58 may contain a squeaker, the sound of which provides stimulation to the sense of hearing of the animal and encourages play with stuffed toy 10. When play-stimulation item 68 is exhausted, e.g., when it has become damaged, when its batteries have died, or when it is otherwise rendered incapable of producing sufficient sound, pouch 58 containing the exhausted play-stimulation item 68 may be removed and a new pouch 58 containing a fresh play-stimulation item 68 (e.g., an unbroken mechanical squeaker or an electronic squeaker with new batteries) may be inserted to restore play stimulation.

Since, during play, play-stimulation item 68 is located inside pouch 58, pouch 58 is located inside inner shell 56, and inner shell 56 is located inside outer shell 12, play-stimulation item 68 is invisible to the animal. That is, play-stimulation item 68 is out of sight of the animal and well protected by shells 12 and 56 and pouch 58. The animal has no direct access to play-stimulation item 68.

In summary, the present invention provides a stuffed toy 10 containing a replaceable play-stimulation item 66. Through the use of multiple layers, stuffed toy 10 is configured without loose stuffing material 16, and is thereby made resistant to the spillage of stuffing material 16 during active play. Stuffed toy 10 contains an internal pouch 58 inside of which is located a play-stimulation item 68 (e.g., catnip and/or a squeaker) Stuffed toy 10 has a sealable opening 22 through which pouch 58 may be inserted to restore play stimulation as desired.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A stuffed toy configured for stimulation of one or more senses of an animal and play by said animal, said toy comprising:
    a pliable shell formed of a first fur;
    a pouch formed of a second fur and contained within said pliable shell during said play; and
    a play-stimulation item wholly contained within said pouch and configured to issue an emission detectable through said one or more senses of said animal during said play.

2. A stuffed toy as claimed in claim 1 wherein:
    said pliable shell encloses an interior cavity; and
    said pouch is configured to substantially conform to said interior cavity.

3. A stuffed toy as claimed in claim 2 wherein said pliable shell comprises:
    a perimeter;
    a seam partially formed around said perimeter and defining an opening configured to provide access to said interior cavity; and
    a fastener configured to releasably seal said opening.

4. A stuffed toy as claimed in claim 3 wherein said pouch is configured to be able to pass through said opening while said play-stimulation item is contained therein.

5. A stuffed toy as claimed in claim 3 wherein said fastener comprises:
    a hook part affixed to said pliable shell upon a first side of said opening; and
    a loop part affixed to said pliable shell upon a second part of said opening and configured to engage said hook part.

6. A stuffed toy as claimed in claim 1 wherein;
    said pliable shell is a first pliable shell;
    said stuffed toy additionally comprises a second pliable shell formed of a third fur and contained within said first pliable shell;
    said pouch is contained within said second pliable shell during said play.

7. A stuffed toy as claimed in claim 6 wherein:
    said first pliable shell encloses a first interior cavity;
    said second pliable shell is configured to substantially conform to said first interior cavity;
    said second pliable shell encloses a second interior cavity; and
    said pouch is configured to substantially conform to said second interior cavity.

8. A stuffed toy as claimed in claim 7 wherein:
    said first pliable shell comprises:
        a first perimeter; and
            a first seam partially formed around said first perimeter;
    said second pliable shell comprises:
        a second perimeter; and
        a second seam partially formed around said second perimeter;
    said first and second seams together define an opening configured to provide access to said second interior cavity; and
    a fastener configured to releasably seal said opening.

9. A stuffed toy as claimed in claim 1 wherein:
    said play-stimulation item is an olfactory-excitation material; and
    said emission is an odor.

10. A stuffed toy as claimed in claim 9 wherein said animal is a cat and said play-stimulation item is catnip.

11. A stuffed toy as claimed in claim 1 wherein:

said play-stimulation item is a sound-producing device; and said emission is a sound.

12. A stuffed toy as claimed in claim 11 wherein said play-stimulation item is a squeaker.

13. A stuffed toy as claimed in claim 1 wherein said play-stimulation item is invisible from outside said stuffed toy during said play.

14. A stuffed toy configured for stimulation of one or more senses of an animal and play by said animal, said toy comprising:

an outer pliable shell having a first perimeter;

an inner pliable shell within said outer pliable shell and having a second perimeter configured to enclose an interior cavity;

a first seam partially formed around said first perimeter;

a second seam partially formed around said second perimeter, wherein said first and second seams together define an opening into said interior cavity;

a fastener coupled to one of said outer and inner pliable shells and configured to releasably seal said opening;

a pouch configured to be contained within said interior cavity during said play; and a play-stimulation item wholly contained within said pouch and configured to issue an emission detectable through said one or more senses of said animal during said play.

15. A stuffed toy as claimed in claim 14 wherein, said pouch is a first pouch and said play-stimulation item is a first play-stimulation item, and wherein said stuffed toy additionally comprises:

a second pouch configured to be contained within said interior cavity during said play; and a second play-stimulation item contained within said second pouch, wherein:

said first play-stimulation item fails to stimulate said play by said animal when said first play stimulation item is exhausted;

said second pouch is configured to replace said first pouch within said interior cavity when said first play-stimulation item is exhausted; and said second play-stimulation item is configured to restore stimulation in said play by said animal.

16. A stuffed toy as claimed in claim 14 wherein said fastener is a hook and loop fastener.

17. A stuffed toy as claimed in claim 14 wherein:

said outer pliable shell is formed of a first fur;

said inner pliable shell is formed of a second fur; and said pouch is formed of a third fur.

18. A stuffed toy configured for play by an animal, said stuffed toy comprising:

an outer pliable shell formed of a first fur, said outer pliable shell having a first perimeter;

an inner pliable shell formed of a second fur, said inner pliable shell being within said outer pliable shell and having a second perimeter forming an interior cavity within said outer and inner pliable shells;

a plurality of seams partially formed around said first and second perimeters so as to define an opening though said outer and inner pliable shells into said interior cavity;

a hook-and-loop fastener for releasably sealing said opening;

a pouch formed of a third fur, said pouch being configured to pass through said opening and to be contained within said interior cavity during said play by said animal; and a play-stimulation item configured to be wholly contained within said pouch during said play, and to provide stimulation for said play by said animal, wherein said play-stimulation item is one of an olfactory-excitation material and a sound-producing device.

* * * * *

UNITED STATES PATENT AND TRADEMARK OFFICE
CERTIFICATE OF CORRECTION

PATENT NO. : 6,663,457 B2 Page 1 of 1
DATED : December 16, 2003
INVENTOR(S) : Sharon A. Ritchey It is certified that error appears in the above-identified patent and that said Letters Patent is hereby corrected as shown below:

<u>Column 7,</u>
Line 52, delete the number "66." and replace it with the number -- 68. --

Signed and Sealed this

Ninth Day of March, 2004

JON W. DUDAS
*Acting Director of the United States Patent and Trademark Office*